March 11, 1952 R. K. POTTER 2,589,130

PERMUTATION CODE GROUP SELECTOR

Filed June 24, 1949 3 Sheets-Sheet 1

INVENTOR
R. K. POTTER
BY Harry C. Hart
ATTORNEY

PERMUTATION CODE GROUP SELECTOR

Filed June 24, 1949 3 Sheets-Sheet 2

INVENTOR
R. K. POTTER
BY Harry C. Hart
ATTORNEY

March 11, 1952 R. K. POTTER 2,589,130

PERMUTATION CODE GROUP SELECTOR

Filed June 24, 1949 3 Sheets-Sheet 3

INVENTOR
R. K. POTTER
BY Harry C. Hart
ATTORNEY

Patented Mar. 11, 1952 2,589,130

UNITED STATES PATENT OFFICE 2,589,130

PERMUTATION CODE GROUP SELECTOR

Ralph K. Potter, Madison, N. J., assignor to Bell Telephone Laboratories, Incorporated, New York, N. Y., a corporation of New York Application June 24, 1949, Serial No. 101,029

2 Claims. (Cl. 177—353)

This invention relates to communication channel selection.

A principal object of the invention is to furnish a calling signal to a desired one of a group of receiver stations by the transmission of a code signal to which only the desired station is responsive. A particular object is to establish a communication path to the desired receiver station, to the exclusion of other members of the group, without resort to the techniques of frequency separation or time division among channels. A related object is to communicate in a convenient manner with any desired one of a group of moving vehicles.

In a wire line telephone system of a number of interconnected stations, the problem of calling the attention of a particular subscriber presents no difficulties. A ringing signal is simply applied to the wire line assigned to that subscriber. The case of a radio telephone system such as must be employed for communication with a moving vehicle is different; and here, if complete separation among channels is required, some sort of multiplexing, for example frequency division or time division, must be resorted to. Such systems are not economical of frequency space.

The present invention is based on the realization that, for many purposes, complete isolation among channels is unnecessary, that, where secrecy is not required, it suffices to call the attention of a single desired member of a group to the fact that a message about to be broadcast over a channel which is common to all the members of the group is intended for him alone. Thereupon his receiver is turned on, manually or automatically, for the duration of the message which is intended for him. Meanwhile other members of the group are not disturbed or annoyed by audible messages intended for others and of no interest to them.

By following this general principle the selective features of the system may be confined to the attention-calling signal designating each particular member of the group. This calling signal, while it must be sufficiently complex to be easily distinguished from the calling signals designating the other members of the group, may still be far simpler in structure than the signal which represents the message as a whole. An eminently suitable group of distinguishable calling signals are the various code pulse groups which may be constructed in accordance with the binary or two-valued code which is coming to be employed, in so-called pulse code modulation systems, for the transmission of messages, even at the expense of the frequency space required. This lavish use of frequency space is not required in the present system because the basic pulse repetition rate employed need not be especially rapid.

In accordance with the present invention, therefore, a calling signal is generated, for each receiver of the group, which comprises a sequence of "on-off" pulses arranged in accordance with the conventional binary permutation code. To call a desired receiver, one such signal is broadcast to all the receivers of the group. Each receiver is provided with a code pulse group recognizer. The recognizers may be alike in construction but differ in adjustment in such a way that each one responds only to one particular code pulse group. Thus only the desired receiver responds in each particular case. This response informs the operator that he is wanted, whereupon, in one embodiment, he may turn on his receiver and hear his message. In another embodiment, the response of the recognizer turns on the receiver automatically, and turns it off again at the conclusion of the message.

Various code pulse group recognizers are possible. In one, the incoming train of pulses which constitute the group is led through a delay unit which is provided with a number of lateral taps. Each of these taps is connected to one of a row of deflecting elements in a cathode beam tube. These deflecting elements are also provided with biases which differ from one receiver to the other. The magnitudes of the biases are adjusted with respect to the amplitudes of the pulses as they are derived from the delay unit taps so that, when the desired train of code pulses enters the delay unit, each of the biases will be exactly balanced by the signal output of one of the taps, whereupon the cathode beam passes undeflected through all of a series of apertures to strike a target and generate a signal which may be applied to illuminate a lamp, ring a bell, or turn on the communication receiver. At the conclusion of the message a special "finish" code pulse group is similarly broadcast. It is "recognized" by the "finish" recognizers of all the receivers, but the resulting "finish" signal is inoperative in all cases except that of the receiver which is presently active. This one receiver is turned off by the finish signal. Each receiver station may therefore be provided with a "start" code recognizer and a "finish" code recognizer. These two code recognizers at each station may share a single delay unit, thus economizing apparatus. The "finish" code recognizers of the several stations may be alike in adjustment as well as in construction, thus effecting an economy in the assignment of code pulse groups.

Alternatively, a system of triodes may be arranged in tandem, individually biased in accordance with the particular code pulse group to be recognized, and the voltage outputs of the several taps of the delay unit may be applied to the control electrodes of these several tubes in a sense to balance their several biases for the particular desired code pulse group and for no other, whereupon the last tube of the series delivers an output signal which may be utilized as before.

If desired, a number of code recognizing units, each adjusted to recognize a single code, may share one and the same delay unit. Such a system finds use in a situation in which a number of individual receivers are in fixed, as distinguished from mobile, locations and comparatively near together as in a business office. In this case, of course, the message communication channel may be by way of wire line or radio, as preferred.

The invention will be fully apprehended from the following detailed description of an illustrative embodiment thereof, taken in connection with the appended drawings, in which:

Fig. 1 is a schematic diagram, partly in block form, showing a system by which an operator at a central station may communicate with any selected one of a group of outlying stations which may be vehicles;

Figs. 2*a* to 2*c* are explanatory wave form diagrams;

Figures 1, 2A, 2B, 2C:
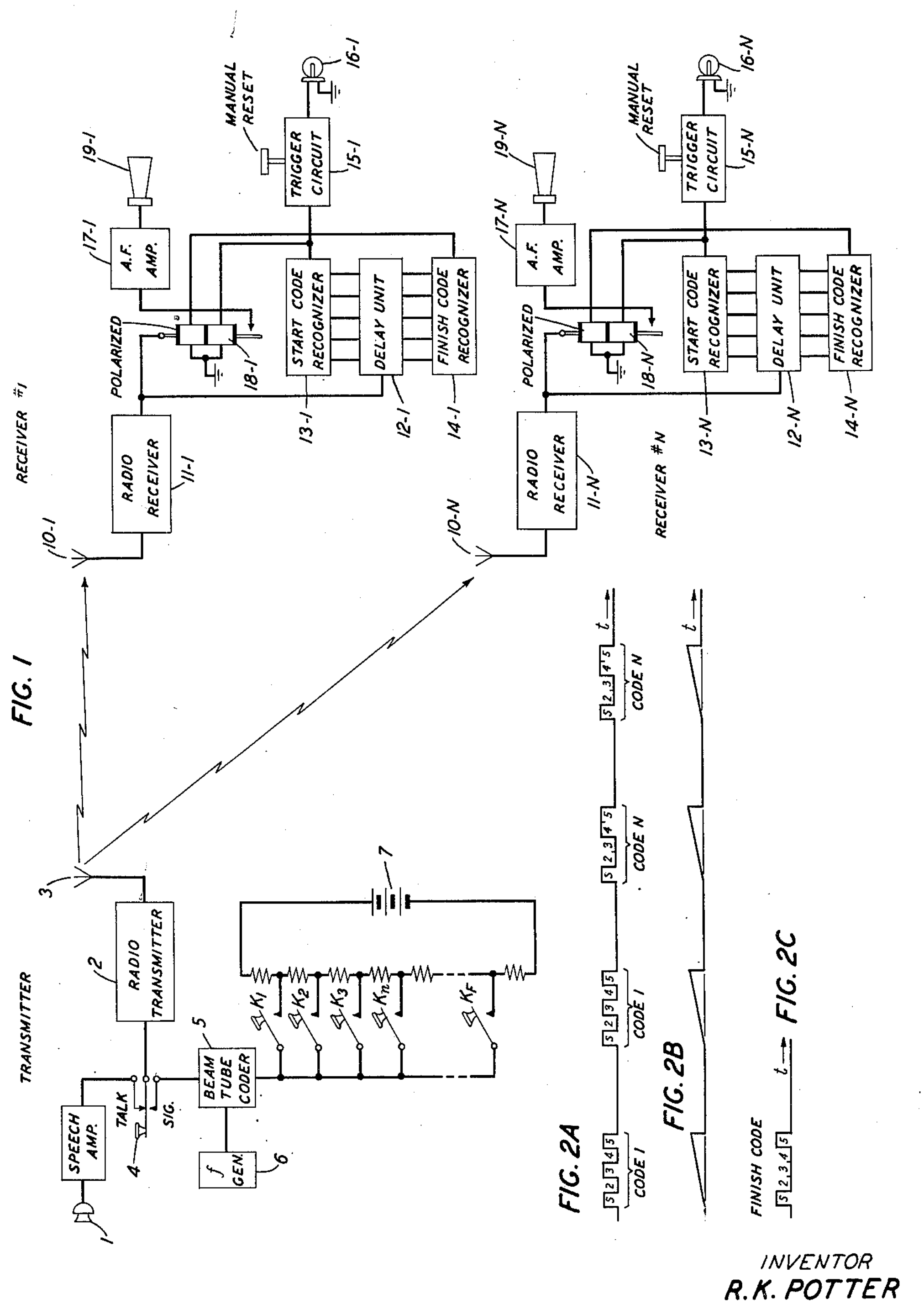

Referring now to the drawings, Fig. 1 shows the salient features of a system in accordance with the invention. To avoid undue complexity of the drawings only two receiver stations, designated receiver No. 1 and receiver No. N, are shown although it is contemplated that a large number of such stations shall be provided. Each of these stations may be regarded as part of the equipment of a moving vehicle such as a police car.

All of the receiver stations are served by a single central transmitter station in which either speech, originating for example in a microphone 1, or calling signals originating in the apparatus shown at the lower part of the figure, may be supplied to a radio transmitter 2 and thence broadcast by way of an antenna 3 to all of the receiver stations. The choice between speech signals and calling signals is made by the movement of a manual switch 4 to an upper terminal energized by the microphone 1 or to a lower terminal connected to the calling signal generator apparatus.

The calling signal generator apparatus may comprise as its central element a coding device 5 such, for example, as that described in an article entitled "Electron beam deflection tube for pulse code modulation," published in the Bell System Technical Journal, vol. 27, page 44, for January 1948. In brief, this instrument comprises a cathode beam tube having a coding mask interposed in the path of the beam between the cathode and the target. The mask itself contains a number of apertures arranged in rows and columns, the aperture arrangement in each row differing from the aperture arrangement in each other row. For the sake of definiteness the columns may be regarded as extending vertically and the rows horizontally. The beam is first deflected vertically along the mask to a particular aperture row corresponding with the calling signal to be transmitted. It is then deflected laterally along the particular aperture row under the action of a saw tooth sweep voltage 6. As the beam passes in succession over the apertures of the row, the beam electrons pass through these apertures to strike the target behind the mask, thus giving rise to a sequence of electrical pulses in an output circuit, which sequence or train of pulses is uniquely related to the original signal.

In the present case the original deflecting signal may be applied to the coder 5 by closing a selected one of the keys $K_1$, $K_2$ . . . $K_N$ thus applying a selected fraction of the voltage of a battery 7 to the coder 5. As long as a particular one of these keys is depressed, a sequence of identical code pulse groups is generated, one for each lateral sweep of the cathode beam; and as long as the manual switch 4 is held in the downward position the resulting train of code pulse groups is applied to the radio transmitter 2 and so broadcast by way of the antenna 3.

For reasons which will appear below, it is desirable that successive code pulse groups be spaced apart by time intervals which are longer than the duration of any single code pulse group. This situation is illustrated in Fig. 2A which shows, at the left of the figure, two such similar code pulse groups comprising a part of a train, separated by an interval which is longer than either group. This pulse distribution may be achieved by causing the lateral sweep of the cathode beam of the coder tube to be governed by a saw tooth wave having the form shown in Fig. 2B. Apparatus for generating such saw tooth waves is well known in the art.

For the purposes of the present system, which is non-synchronous, the operation of each receiver commences on the arrival of the first pulse of a code pulse group which is actually present. In order to utilize the full capacity of the coding mask described in the aforementioned publication in the Bell System Technical Journal, the array of coding apertures may be preceded by a single aperture which extends the full length of the mask, thus giving rise to a primary "start" pulse preceding every code pulse group. However, since the system is non-synchronous this modification of the coding device is not necessary and the first pulse actually present in each code pulse group can serve as the start pulse.

The invention is not restricted to any particular coder, the one described above being selected by way of illustration only. Other coders such, for example, as described in J. P. Smith Patent 2,403,561 may equally well be employed.

When any one of the code selection keys $K_1$ to $K_N$ is depressed in order to select a particular code group, such for instance as that shown in Fig. 2A as code No. 1, the manually operated switch of Fig. 1 must be connected to its lower contact, in order that the selective code groups shall be transmitted by way of the radio transmitter 2 and so broadcast by way of the antenna 3 to all of the receiver stations. The selected code pulse group is then transmitted repeatedly for the duration of closure of the selector key and of the manual switch 4. By depressing several of the keys $K_1$ to $K_N$ in succession, corresponding different code pulse groups can be broadcast. This situation is shown in Fig. 2A where a train of code groups of one character follows a train of code groups of another character. After the operator at the transmitter station has sent out the desired selective code group or groups of pulses for a suitable length of time, he may throw his manual switch 4 to the "talk" contact and proceed to broadcast a message by way of the microphone 1 to all of the receiver stations which he has selected and to no others.

The action of a typical receiver station will be described in connection with the code pulse group No. 1 of Fig. 2A and the response of receiver No. 1 to this code pulse group. The code pulse group is first received at an antenna 10 in the form of pulse-modulated radio waves. It is amplified, demodulated, and regenerated as necessary or desirable by a radio receiver 11, and is then passed to a delay unit 12. This delay unit may be terminated at its far end to prevent reflection and may be provided with a number of taps, located along its length at distances which are correlated in well-known fashion with the pulse propagation speed in the delay unit and the code pulse timing. The traversal of the code pulses through the delay unit 12 causes the several pulses to appear at the several taps in succession until a code pulse group fully occupies the delay unit and the pulses coincide with all of the taps. A selective code recognizer 13 whose details will be described hereafter, is coupled to these taps and recognizes only one of the code groups, for example code pulse group No. 1 of Fig. 2A, and when it does so, it delivers a signal of the duration of a single pulse to a trigger circuit 15 of any desired type which furnishes an attention-calling signal, such for example as the illumination of a lamp 16. Thereupon the attendant operator of receiver No. 1 may turn on his amplifier 17 and hear the message being broadcast from the transmitter station. Preferably, however, the output of the recognizer 13 is also connected to a two-condition device which is shown for illustrative purposes as a polar relay 18, although for practical purposes it is preferably an electronic device such as a multivibrator. Operation of this relay 18 completes a circuit from the radio receiver to a voice frequency amplifier 17 whereby the incoming speech message is reproduced in a loudspeaker 19.

Inasmuch as any one or any number of the various selecting keys $K_1$ to $K_N$ may be depressed in rapid succession, the corresponding receivers may be switched into the listening condition in order that the operator at the central transmitting station may address them as a group.

At the conclusion of the speech transmission, the operator at the central transmitter station depresses his manual switch 4 and depresses the key $K_F$, thereby sending out a "finish" code pulse group which is distinctive from all of the "calling" code pulse group signals. All the receivers of the group are preferably provided with similar "finish" code recognizers 14 which are responsive alike to the finish code pulse group which operate in the manner described above to energize the polar relay 18, but this time to the disconnect position, and the voice paths of all the receivers are thus disabled.

In the event of non-attendance or inattention at any of the receivers at the time of a selective code pulse group call, the signal light 16 which has been illuminated as described above remains illuminated until manually disabled, thereby notifying the attendant that a call has been received.

Figures 3, 5:
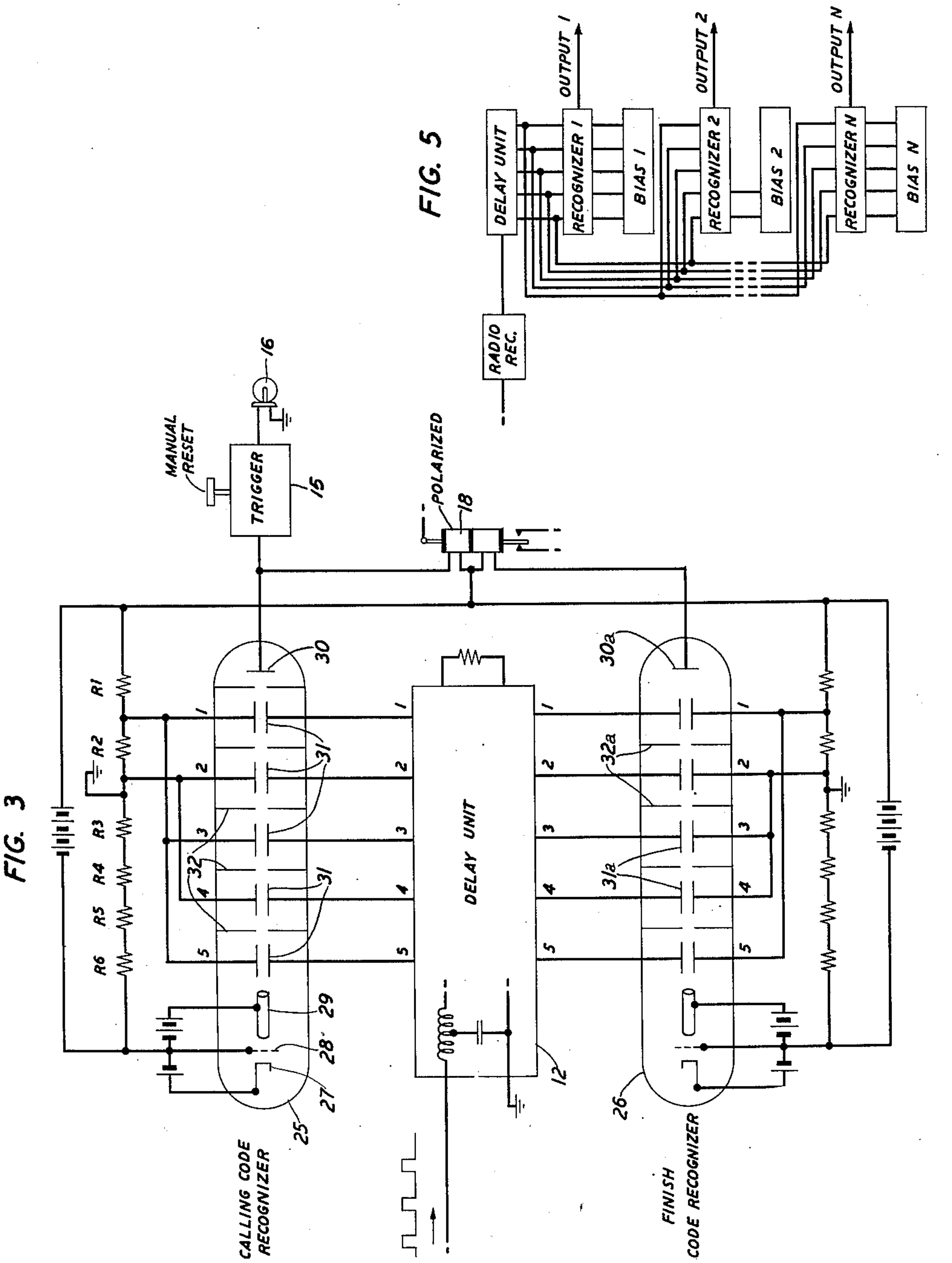
Fig. 3 is a schematic circuit diagram showing a cathode beam code recognizer.
Fig. 5 is a schematic block diagram showing a multiplicity of code selector units all of which share a common delay unit.

Each of the several receivers of the group is provided with apparatus for recognizing any of the code pulse group signals to which it is required to respond. In the present illustrative case of a group of mobile receivers each one of them is normally intended to respond to its particular calling signal and also to a "finish" signal. The "finish" signals may be alike for all of the receivers. Fig. 3 shows apparatus of this character for one receiver of the group, taken by way of illustration as receiver No. 1 which may respond to calling signal code pulse groups having the configuration indicated in the left-hand part of Fig. 2A and to a finish signal indicated in Fig. 2C. The apparatus may comprise one special cathode ray tube 25 for responding to the calling signal and another 26 for responding to the finish signal. The two tubes 25, 26 may be identical in construction, differing only in their bias adjustments, and they may share a common delay unit.

Each of the tubes 25, 26 may comprise a conventional electron gun and electron-optical focusing system 27—29, a beam target 30 and a series of pairs of deflecting elements 31 arranged between the accelerating anode 29 and the target 30. In addition, a mask 32 having a small central aperture is arranged in front of each pair of deflecting elements 31. When the beam is undeflected by any of the deflecting elements 31 it passes through the apertures of all of the masks 32 to strike the target 30. When, however, it is laterally deflected by an unbalanced voltage applied to any one or more of the deflecting elements 31, it is obstructed by one of the masks 32 and fails to reach the target 30.

The several deflecting elements 31 of each tube are individually biased in accordance with the code pulse group to be recognized. Thus in the upper calling code recognizer tube 25 the upper plate of the first, third and fifth deflector plate pairs 31 are biased positively while the second and fourth remain unbiased. In the absence of a signal, then, the cathode beam is laterally deflected to strike the unapertured portion of the first mask 32; and even were this not true it would similarly fail to pass the third or the fifth mask.

The several lateral taps of the delay unit 12 are individually connected to the lower deflecting plates of the several deflector plate pairs. Thus when a code pulse group having the configuration for which this apparatus is adjusted, namely that indicated at the left in Fig. 2A, enters the delay unit 12 the several pulses of the group coincide in location, at a certain instant, with the locations of the taps. At this instant the first, third and fifth pulses of the group are applied to the lower plates of the first, third and fifth deflection element pairs 31 and neutralize their biases, while the second and fourth pulse positions which are blank do not alter the biases of the second and fourth deflecting elements. Under this condition all of the present biases are individually neutralized by the pulses derived from the taps on the delay unit 12 and the beam passes through the apertures of all of the masks 32 in sequence to strike the target 30 and give rise to an output signal. With a code pulse group of any other configuration, the beam is deflected upward or downward by at least one deflector plate pair and so fails to reach the target. Thus the tube 25 responds to the selected code pulse group and to no other.

When the beam strikes the target 30 a current flows in the output circuit which may comprise one winding of the polar relay 18. This acts to establish the voice path from the radio receiver 11 to the reproducer 19 in the manner described above. At the same time the voltage across this winding is applied to the trigger device 15 whose output illuminates the lamp 16. The trigger device 15 may be of any desired type and may be restored to its normal condition by a manual reset control, thus extinguishing the lamp 16.

At the conclusion of the message from the transmitter, when the operator presses his "finish" key, there is generated and transmitted a special "finish" code pulse group which may, for example have the configuration shown in Fig. 2C. This code pulse group operates in the manner described above on the finish code recognizer tube 26 shown in the lower part of Fig. 3 which is adjusted to respond to this code pulse group only.

For the particular finish code pulse group taken as an example the lower plates of the first and last deflecting element pairs 31*a* are biased positively while the second, third and fourth are unbiased. Thus receipt of this particular code pulse group and of no other permits the cathode beam of the finish code recognizer tube 26 to strike its target 30*a*, delivering an output voltage to the other winding of the polar relay 18 and so breaking the voice path.

Figure 4:
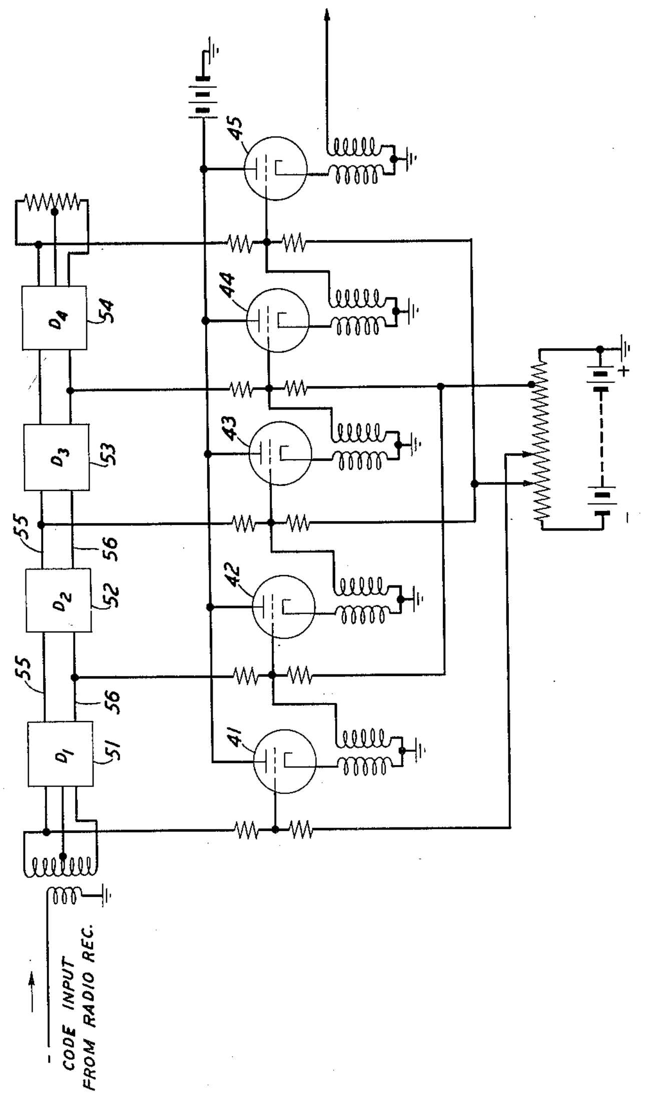
Fig. 4 is a schematic circuit diagram showing a code recognizer utilizing a tandem arrangement of vacuum tubes.

Fig. 4 shows a code pulse group recognizer of alternative construction. It comprises a tandem arrangement of repeater elements such for example as vacuum tube triodes 41–45, each of which is individually biased conformably to the code pulse group to which it is intended to respond. The individual triodes are shown connected as cathode followers, which avoids a reversal of phase as between stages. Interstage coupling by way of transformers having turn ratios greater than unity serves to compensate for the small voltage loss which arises with a group of cathode followers in cascade. It is arranged that a group of pulses derived from taps of a delay unit shall neutralize the biases of the several tubes 41–45 individually. Here, however, the delay unit 51—54 is preferably of the balanced variety such that, for any entering positive pulse a positive voltage appears, after the necessary delay, on the upper interstage conductor 55 and an equal negative voltage on the lower interstage conductor 56. The control elements of the several triodes 41–45 are connected to the upper interstage conductor 55 or to the lower one 56 conformably to the code pulse group for which the recognizer is adjusted. The recognizer illustrated in Fig. 4 is adjusted for the code pulse group of the left hand part of Fig. 2A. Thus the first, third and fifth tubes 41, 43, 45 are biased negatively and supplied with positive pulse voltages from the upper interstage conductor 55 while the second and fourth tubes 42, 44 are biased approximately to cut-off and supplied with voltage from the lower interstage conductor 56. With these connections it is evident that when the code pulse group in question is applied to the delay unit 51—54, positive pulses appear on the upper interstage conductor 55 at the first, third and fifth tapping points and neutralize the negative biases on the first, third and fifth triodes, while no voltage appears at the second and fourth tapping points so that the second and fourth triodes remain at cut-off. Thus, under these conditions all triodes are brought to the threshold of conduction. The last pulse of the sequence, applied to the first tube 41 of the group, then raises the grid of this tube above cut off, by virtue of the fact that it is biased somewhat more positively than the other grids. Thereupon this pulse is transmitted through the tandem arrangement of tubes to deliver an output voltage across the load impedance of the last tube. This output may be utilized as before. With a code pulse group of any other configuration, at least one tube of the group 41–45 will be driven or held below cut-off that no transmission through the sequence of tubes occurs.

With the arrangement of Fig. 4 it is required that each of the code pulse groups to be recognized shall have a pulse present in the first and in the last pulse position. Otherwise errors may occur.

The invention is, of course, not restricted to cases in which only one or two recognizer units are provided at each receiver and associated with a common delay unit, and Fig. 5 illustrates a system in which three or more such selectors are associated with a common delay unit. Here the boxes marked "Recognizer" may be identical in construction, differing only in the manner in which their biases derived respectively from the boxes marked "Bias," are applied to them. Such apparatus finds use as a paging system in an office, where each of the several outputs may be arranged to illuminate a particular lamp, actuate a particular relay or furnish some particular preassigned instruction or order. Still other uses and combinations of the outputs of the various code pulse group recognizers will occur to those skilled in the art.

What is claimed is:

1. Apparatus for recognizing a code pulse group corresponding to a single one of the set of all possible permutations of a fixed number of two-valued code elements which comprises means for generating a deflectible beam, a target disposed to be impinged by said beam when not deflected, a number of beam-deflecting elements disposed adjacent the path of said beam, means for applying substantially steady biases individually to the several deflecting elements to cause the beam to be deflected off the target by at least one of said elements, said biases being adjusted in magnitude and polarity to correspond with the permutation code to be recognized, means for deriving individual signals from the several pulses of said code pulse group, and means for applying said individual signals to said deflecting elements to balance said biases individually, thereby causing said beam to travel without deflection to said target.

2. Apparatus for recognizing a code pulse group corresponding to a single one of the set of all possible permutations of a fixed number of two-valued elements which comprises means for generating a deflectible beam, a target disposed to be impinged by said beam when not deflected, a number of beam-deflecting elements disposed adjacent the path of said beam, means for applying substantially steady biases to the several deflecting elements to cause the beam to be deflected off the target, said biases being adjusted in magnitude and polarity to correspond with the permutation code to be recognized, and means for applying the pulses of said code group individually to said deflecting elements to balance said biases individually, thereby causing said beam to travel without deflection to said target.

RALPH K. POTTER.

REFERENCES CITED

The following references are of record in the file of this patent:

UNITED STATES PATENTS

| Number | Name | Date |
|---|---|---|
| 1,287,396 | Morse | Dec. 10, 1918 |
| 1,932,084 | Opsahl | Oct. 24, 1933 |
| 2,130,166 | Watanable | Sept. 13, 1938 |
| 2,237,671 | Kallmann | Apr. 8, 1941 |
| 2,396,211 | Skellett | Mar. 5, 1946 |
| 2,403,561 | Smith | July 9, 1946 |
| 2,415,359 | Loughlin | Feb. 4, 1947 |
| 2,437,266 | Marrison | Mar. 9, 1948 |
| 2,438,825 | Roth | Mar. 30, 1948 |
| 2,442,702 | Marrison | June 1, 1948 |
| 2,480,115 | Brown et al. | Aug. 30, 1949 |
| 2,487,781 | Bascon et al. | Nov. 15, 1949 |
| 2,495,452 | Grove | Jan. 24, 1950 |
| 2,522,609 | Gloess | Sept. 19, 1950 |